United States Patent [19]

Suzuki et al.

[11] Patent Number: 5,419,983
[45] Date of Patent: May 30, 1995

[54] LEAD ACID BATTERY

[75] Inventors: Yoshie Suzuki, Chigasaki; Fujio Hirano, Hiratsuka, both of Japan

[73] Assignee: Matsushita Electric Industrial Co., Ltd., Osaka, Japan

[21] Appl. No.: 93,708

[22] Filed: Jul. 20, 1993

[51] Int. Cl.⁶ .............................................. H01M 2/32
[52] U.S. Cl. ........................................ 429/7; 429/65; 429/86; 429/150; 429/177; 429/180
[58] Field of Search .................... 429/7, 65, 86, 87, 89, 429/150, 177–180

[56] References Cited

U.S. PATENT DOCUMENTS

| | | | |
|---|---|---|---|
| 4,233,370 | 11/1980 | Heiser et al. | 429/89 X |
| 4,859,546 | 8/1989 | Binder et al. | 429/86 X |
| 4,885,524 | 12/1989 | Wilburn | 429/7 X |

FOREIGN PATENT DOCUMENTS 1963814  6/1970  Germany.
63-6854  2/1988  Japan.

OTHER PUBLICATIONS

Patent Abstracts of Japan, vol. 8, No. 44 (E-229) (1481) 25 Feb. 1984 & JP-A-58 201 269 (Matsushita Denki Sangyo K.K.).
Patent Abstracts of Japan, vol. 17, No. 94 (E-1325) 24 Feb. 1993 & JP-A-04 286 876 (Sony Corp).
Patent Abstracts of Japan, vol. 16, No. 347 (E-1240) 27 Jul. 1992 & JP-A-04 106 883 (Murata Mfg Co Ltd).

Primary Examiner—Stephen Kalafut
Attorney, Agent, or Firm—Stevens, Davis, Miller & Mosher

[57] ABSTRACT

A sealed lead acid battery having a thermostat or thermal protector as a protector of battery from heat is provided, which comprises a battery container comprised of cell chambers each containing a cell element. A terminal box is provided at the end of the battery container. The battery container is provided at the end thereof with the terminal box. The thermostat or thermal protector is mounted in the terminal box to be highly sensitive to heat, thus protecting the lead acid battery from heat. In the terminal box are inserted a pair of charge and discharge terminals and the thermostat or thermal protector, so that safe positioning of the thermostat or thermal protector and good heat conduction from the cell element to the thermostat or thermal protector are secured.

17 Claims, 6 Drawing Sheets 5,419,983

LEAD ACID BATTERY

BACKGROUND OF THE INVENTION

1. Field of the Invention

The present invention relates to a lead acid battery, particularly to a sealed lead acid battery with an electric circuit having at a part thereof a protector for protecting the battery from short circuit or unusual generation of heat, which is generally called a thermal protector or thermostat, and more particularly to an improvement of the structure of the protector by which the protector is mounted onto a terminal box for containing the protector.

2. Description of Related Art

In lead acid batteries with a plurality of cell chambers containing a group of electrode plates or cell elements, the cell chambers are arranged either in one direction or in a U-shaped manner. However, in many cases where batteries have an elongated appearance, the cell chambers are primarily arranged in a row in one direction and connected in series to each other.

Sealed lead acid batteries of a small size with cell chambers arranged in a row have been increasingly required to be light and so handy that they can be mounted in a one touch onto an appliance. In response to this requirement, a manner is taken in which a pair of input and output terminals of a battery are contained in a terminal box provided on one end of an elongated container of the battery.

This manner is such that one of the positive and negative terminals in the terminal box is connected to one of the positive and negative terminals provided on the cell element in the cell most distant from the terminal box, through a lead provided across the opening of the container. The terminal box has a pair of windows exposing a pair of charging and discharging terminals. A pair of input and output terminals are provided on a frame-shaped electrically insulating terminal holder at the right and left ends thereof. The terminal holder is provided at the back side thereof with a recess. A thermostat as a protector is mounted in the recess. The thus formed terminal holder is inserted into the terminal box, and the electric connection is made in the manner as mentioned above, thereby obtaining the battery. The thermostat is provided with such a structure that it is brought into contact with a partition wall separating the cell chamber and the terminal box to raise the heat sensitivity thereof.

Such conventional structure gives a good operation in mounting the pair of input and output terminals and the thermostat onto the terminal holder and then inserting the holder into the terminal box. However, contact between the thermostat and the partition wall is often made poor in the conventional structure, due to unstable mating between the terminal holder or unstable mating between the terminal holder and the terminal box.

This poor contact between the thermostat and the partition wall provides so insufficient heat conduction from the partition wall to the thermostat that adequate heat sensitivity is not given. In the worst case, the battery container may be thermally deformed. That is, when the battery is overcharged, the cell element in the cell chamber may generate heat, which transfers through the partition wall at the bottom of the cell chamber to the thermostat. Overheating due to this overcharge is prevented by switching the thermostat from "on" to "off" to break the circuit. Therefore, the contact between the partition wall and the thermostat adjacent to the wall or the state of heat conduction is an important factor.

SUMMARY OF THE INVENTION

The primary object of the present invention is to solve the problems of the conventional structure as mentioned above and improve the structure for mounting a "thermoswitch" such as a thermostat or thermal protector as a protector onto the partition wall in lead acid batteries to protect the batteries from generated heat.

DETAILED DESCRIPTION OF PREFERRED EMBODIMENTS

In accordance with the present invention, a terminal box, in which a pair of terminals for charge and discharge as output and input terminals and a thermoswitch are to be contained; is provided at one end of a battery container; the terminals are held by a terminal holder and inserted in the terminal box. The thermoswitch is held by a rib made monolithically with the terminal box and brought on one of the surfaces thereof in contact with a partition wall separating the terminal box from a cell chamber containing a cell element, or is contained in the terminal box in such a manner that it faces a partition wall at an interval, which wall separates the terminal box from an adjacent cell chamber.

In the former, bringing the thermoswitch in close contact with the partition wall provides adequate heat conduction through the partition wall to the thermoswitch and thus allows the heat sensitivity of the thermoswitch to be increased, thereby raising the reliability of the thermoswitch on temperatures.

In the latter, the interval provided between the thermoswitch and the partition wall buffers the terminals and the thermoswitch from pressure in inserting the terminal holder into the terminal box or from swelling by a change of inner pressure in the cell chamber during use of the battery for a long period of time. This allows these pressures not to apply directly to the thermoswitch, so that the thermoswitch can be stably operated.

The present invention will be illustrated below with reference to some examples and drawings.

EXAMPLE 1

Figure 1:
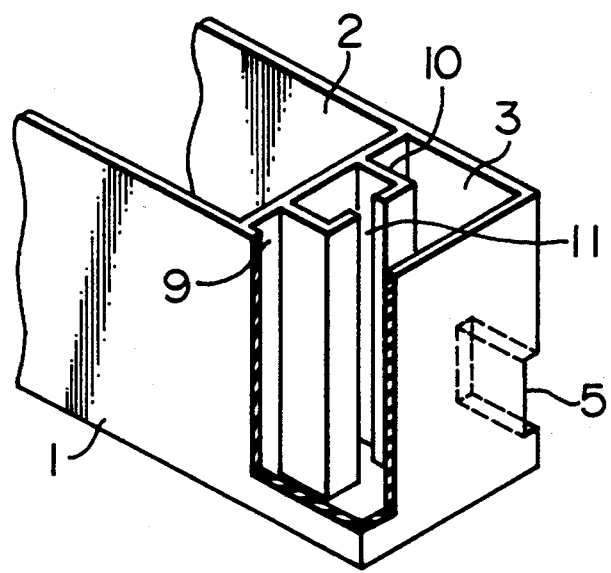
FIG. 1 is a pictorial view of a partially sectioned part of the terminal box according to an embodiment of the present invention.
Figure 2:
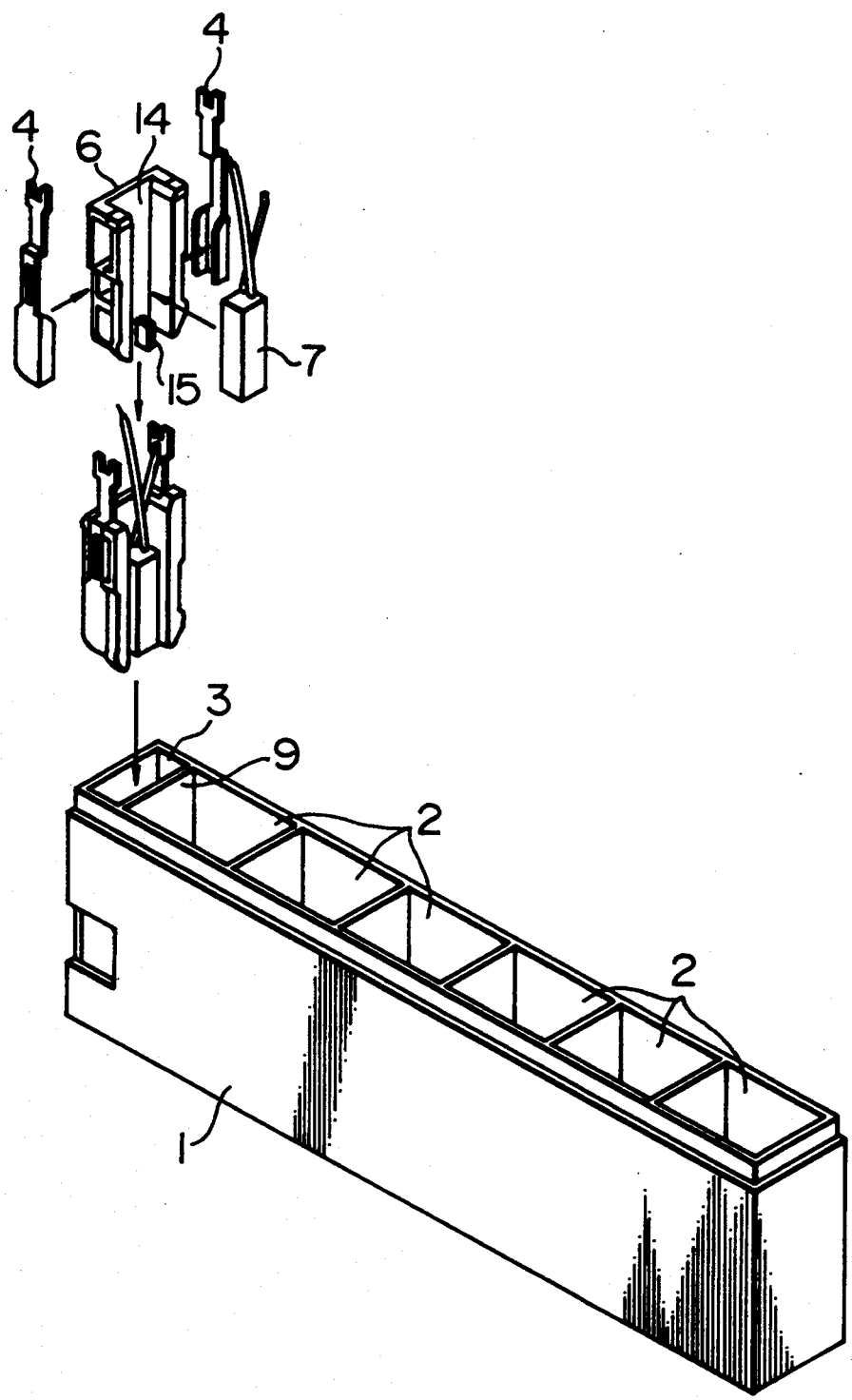
FIG. 2 is a pictorial view showing the state of the terminal holder mounted according to an embodiment of the present invention.

FIG. 1 shows a battery container 1 according to the present invention, provided with a plurality of cell chambers 2 containing a cell element, and a terminal box 3 separated in the container from the cell chamber 2 through a partition wall 9. The terminal box 3 is provided with a pair of windows 5 for exposing a pair of terminals 4 at the corners of the container. In the terminal box is provided a rib 10 for holding a thermostat 7, which is made monolithically with the partition wall 9. The rib 10 is made by two pieces of an L-shaped cross section in such a manner that these pieces face each other and constitute a slit 11 therebetween. Thus, the partition wall 9, two pieces constituting the rib 10 and slit 11 form a box shape. One of the surfaces of the thermostat 7 is brought in contact with the partition wall 9, and the two other surfaces adjacent to the surface above brought in contact with the inner surfaces of the rib 10 to hold the thermostat within the rib 10. FIG. 2 shows a method of assembling the battery. In the method, a terminal holder 6 was provided at the back side thereof with a recess 14 which can moderately mate therein with the rib 10. The recess was provided at the bottom thereof with a supporting rib 15 inserted in the rib 10 to support the bottom of the thermostat 7. Terminals 4 and 4' were mounted on the right and left sides of the holder 6, respectively. The holder 6 was inserted into the terminal box 3. Then, the thermostat 7 was inserted into the box formed by the partition wall 9 and the rib 10. The thermostat 7 was supported on the bottom thereof by the supporting rib 15 inserted through the slit 11 into the rib 10. The supporting rib 15 defined the position of the thermostat.

Figure 3:
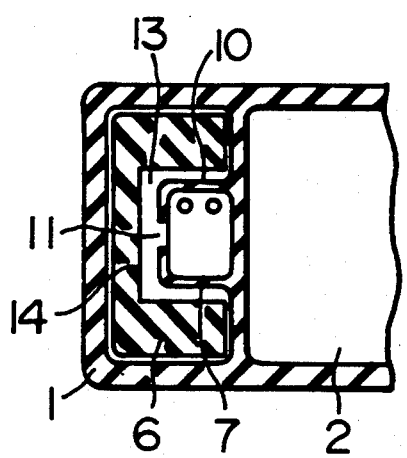
FIG. 3 is a top view showing the state of the thermostat contained in the terminal box according to an embodiment of the present invention.

Furthermore, FIG. 3 shows a terminal holder 6 having recess 14 of a larger size than that of the rib 10 for forming a heat-insulating air layer 13 between the holder 6 and the rib 10. The rib 10 was brought in contact with the two or more surfaces of the thermostat 7 to broaden the heat-conducting surface area thereof. Conventionally, the heat of the cell chamber 2 was transferred only through the partition wall 9 to the thermostat 7, whereas in accordance with the present invention heat from the cell chamber 2 is not only transferred through the partition wall 9 but also the rib 10 itself made monolithically with the partition wall 9, for substantially raising the efficiency of heat conduction. The heat-insulating air layer 13 is formed for preventing the heat transferred from the rib 10 to the thermostat 7 from being transferred to or removed by the terminal holder 6. Moreover, the bottom of the thermostat 7 is supported by the supporting rib 15 to prevent the conduction and emission of heat from the bottom of the thermostat 7. The supporting rib 15 is not provided at the rib 10 made monolithically with the partition wall 9 but at the terminal holder 6 to avoid the lowering of the moldability of the battery container, because forming the rib 10 in a box shape and providing the supporting rib 15 on the rib 10 would lower the strength of a metal mold (core) for forming the rib with the supporting rib.

Thus, making the rib for holding the thermostat monolithically with the partition wall separating the terminal box from the cell chamber makes it possible to stably bring the thermostat in close contact with the partition wall and to reduce unstable heat conduction from the partition wall to the thermostat to a highly low extent.

EXAMPLE 2

Figure 4:
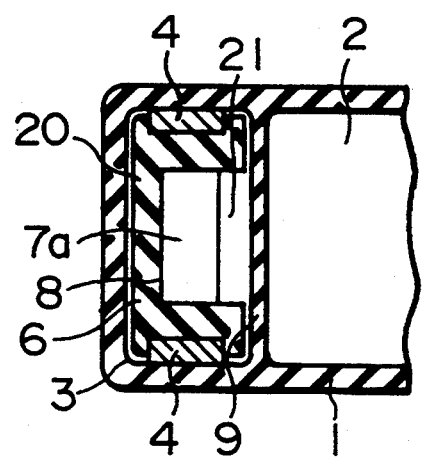
FIG. 4 is a schematical cross-sectional view of a part of the terminal box according to another embodiment of the present invention.

Terminal holder 6 is preferably limited in such an outer dimension that the body 20 of the holder is inserted in a terminal box 3 so as not to form any space between the inner surfaces of the terminal box and the body of the holder, as shown in FIG. 4. The terminal holder 6 holds a pair of output and input terminals 4 and the thermostat or a thermal protector 7a comprising a metal case containing an element therein. The thermal protector 7a is unmovably held by adhering it to or mating it with recess 8 at the depth thereof, which recess is formed in the body 20 of the holder at the back side thereof in a larger depth than the thickness of the thermal protector 7a. Thus, the body 20 of the holder is inserted into the terminal box 3 in such a manner that the thermal protector 7a faces the wall 9 to thereby form a space 21 between the wall and the thermal protector. The pair of terminals 4 are held by the body 20 of the holder at both right and left sides thereof and then inserted into the box 3, whereby parts of the terminals 4 are exposed to outside at the windows 5 of the container and function as the charge and discharge terminals.

The space 21 can absorb a pressure produced in inserting the holder into the terminal box or swelling due to a change of pressure in the cell chamber during use. Thus, the space 21 can prevent the pressure from being applied directly to the thermal protector 7a.

Since the pressure produced in inserting the terminal holder 6 into the terminal box 3 is not applied directly to thermal protector 7a and the pressure produced by swelling due to a change of internal pressure in the cell chamber during use for a long period of time is not applied via the wall 9 to the thermal protector 7a, the thermal protector 7a can be stably operated for a long period of time.

Figure 5:
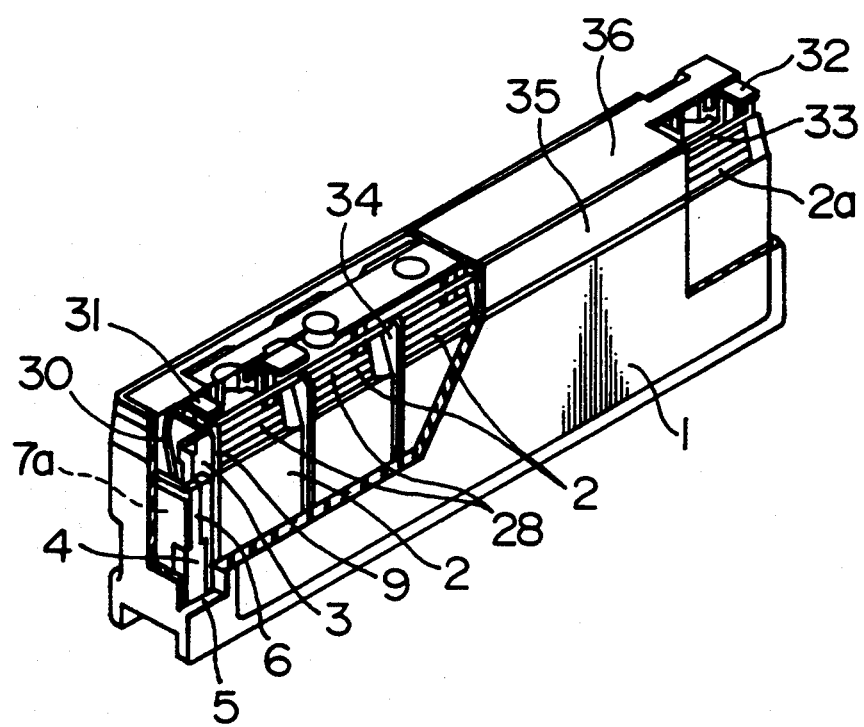
FIG. 5 is a pictorial view of a partially sectioned part of the battery according to the present invention.

The sealed lead acid battery of the present invention is constructed as shown in FIG. 5, regardless of how to assemble a pair of output and input terminals 4 and thermostat 7 or thermal protector 7a in terminal box 3.

That is, groups of grids 28 are inserted into respective cell chambers 2 in a battery container 1, and the groups of grids are electrically connected in series with fine lead wires to each other.

As mentioned above, the pair of output and input terminals 4 in the terminal box 3 is held by the terminal holder 6 and partially exposed at the windows 5. The holder further contains a thermal protector 7a for protecting the battery. Lead wire 30 for one of the terminals of the thermal protector 7a is connected to one electrode pole 31 of the cell element 28 contained in the cell chamber adjacent to the terminal box 3. Furthermore, a lead wire for the other of the terminals of the thermal protector 7a is connected to one of the output and input terminals 4. Thus, the thermal protector 7a also functions as a lead wire for connecting one of the output and input terminals to any one of the positive and negative electrodes of the cell element in the nearest cell chamber.

In addition, electrode pole 32 as one of the terminals of the cell element 28 contained in cell chamber 2a which is most distant from the terminal box 3 is connected to one end of lead wire 33. The lead wire 33 is positioned at the side opposite to the side at which the wires connecting the groups of grids 28 contained in the cell chambers are positioned, in order to form the lead wire 33 in a form of straight line. The lead wire 33 is inserted into an indent 34 provided at the top of the partition walls 9 between the cell chambers 2 of the battery container 1. That is, a small projection is provided so as to extend upwardly on part of the partition wall 9, at the top of which is provided an indent having a semicircular shape in cross section, and the lead wire 33 is mated to the semicircular indent and secured to be fixed in a form of straight line with the grasping force of the projection.

Figure 6:
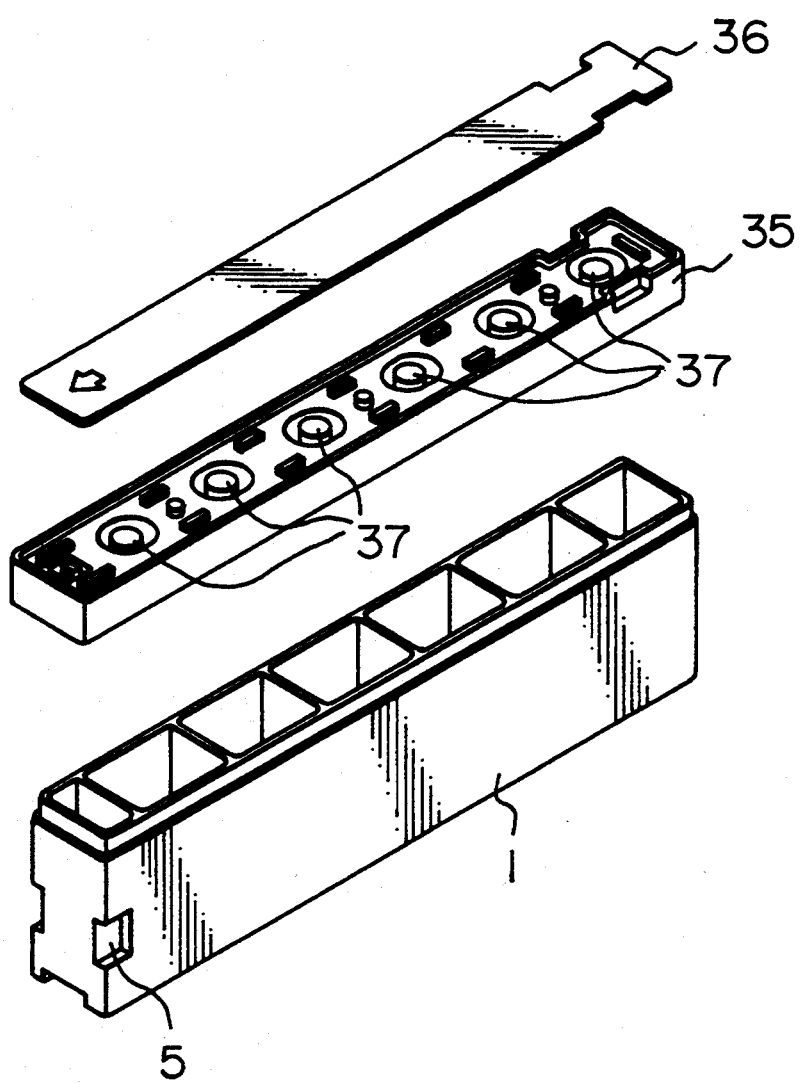
FIG. 6 is a pictorial view of the battery container, intermediate cap and top cap according to an embodiment of the present invention.

Number 35 in FIG. 6 represents an intermediate cap. Number 36 represents a monolithic plate-shaped top cap covering the intermediate cap having openings. The intermediate cap is assembled as shown in FIG. 6, and adhered to the battery container 1 with an adhesive, and the top cap is adhered onto the intermediate cap.

Figure 7:
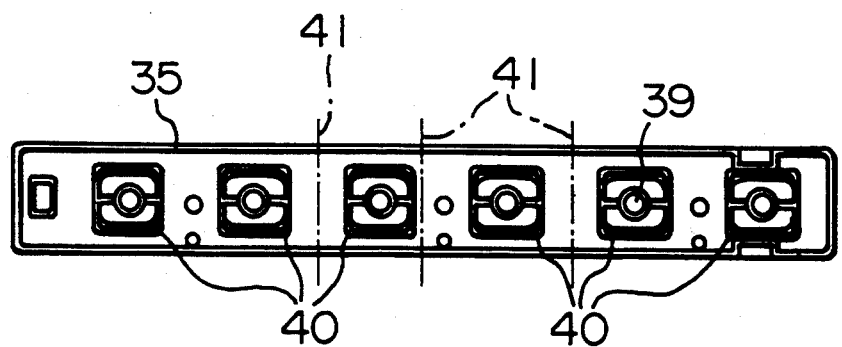
FIG. 7 is a view showing the back side of the intermediate cap.
Figure 8:
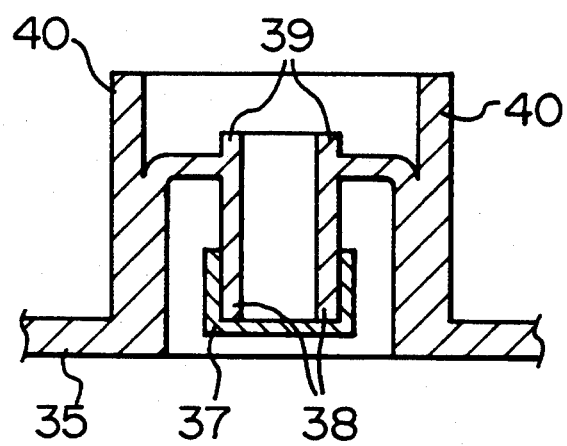
FIG. 8 is a view showing a sectioned main part of the intermediate cap.

From FIG. 8, it is clear that the intermediate cap 35 is provided with cylindrical vents 38 on each of which a cap-type safety valve 37 is mounted, over a plurality of the cell chambers 2 in the battery container 1. An annular recess is formed around the cylindrical vent 38, with which the cap-type safety valve 37 is mated to the top of the vent 38. A piece of the top cap 36 is provided so as to cover the safety valve 37. FIGS. 7 and 8 both show inversely the top and bottom of the intermediate cap 35 in the battery container-capped state (FIG. 6). The intermediate cap 35 has an inside vent 39 formed to project in the cell chamber, at the side opposite to that at which the vent 38 is provided. A rib 40 is formed around the inside vent 39. The rib 40 is in a rectangular frame form and higher than the height of the inside vent 39.

Between the rib 40 and the frame of the intermediate cap 35 there is a major surface 41 of the intermediate cap 35. A channel for an adhesive, the bottom of which forms the major surface, is filled with the adhesive, which adheres the battery container 1 to the intermediate cap 35. When the sealed lead acid battery is constituted with the intermediate cap, the adhesive is not flown into the inside vent 39, event if the intermediate cap is filled at the back side thereof with a larger amount of the adhesive, because the rib 40 is higher than the inside vent 39. Furthermore, the rib 40 supports the inside vent 39 via the bottom of the annular recess and, therefore, the mechanical strength of the vent 38 can be raised and the vent 38 and the bottom of the recess can be prevented from being bent downwardly when the cap-type safety valve 37 is mounted onto the vent 38. Thus, the safety valve can reliably and easily be mounted.

Figure 9:
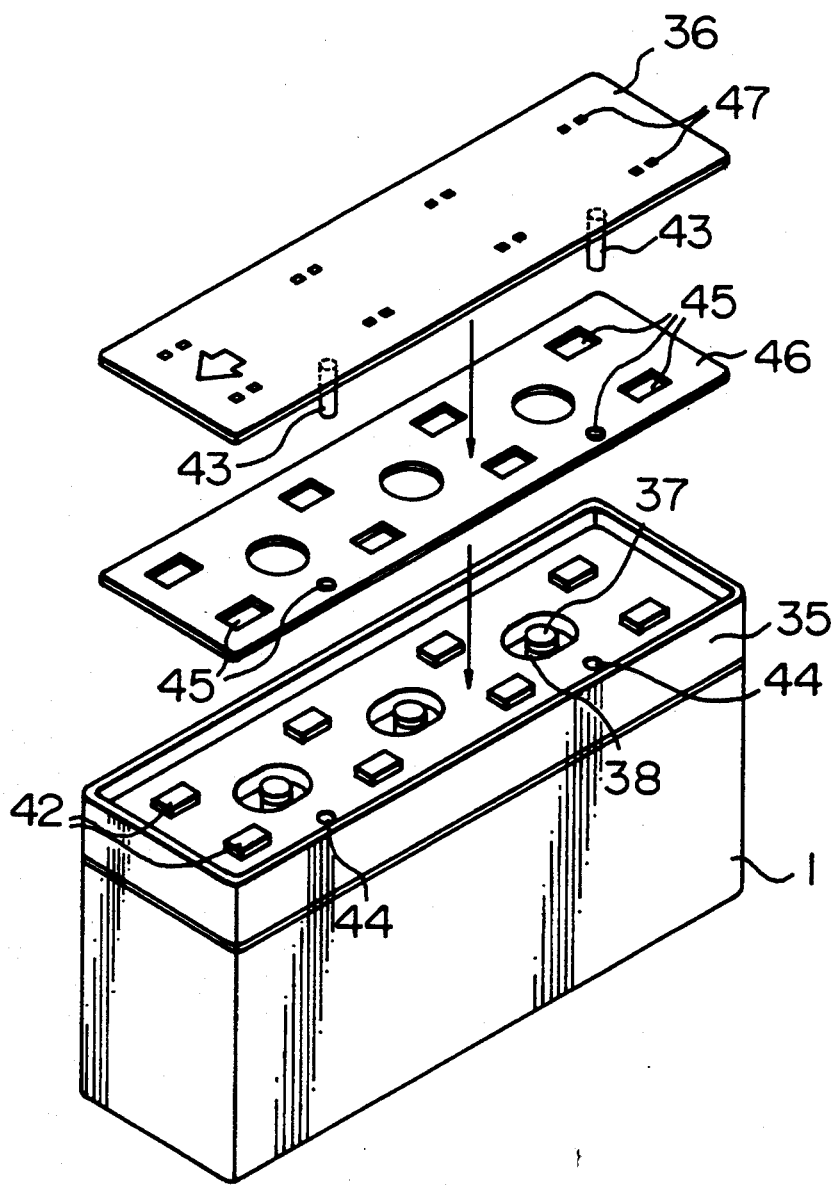
FIG. 9 is a pictorial view of the battery according to a further embodiment of the present invention.

A liquid-absorbing sheet is preferably provided between the intermediate cap and the top cap. The liquid-absorbing sheet in addition to the direct adherence between intermediate cap 35 and the top cap 36 does not permit an electrolyte to leak out of the battery even if a large amount of the electrolyte leaks out through the valve during operation of the battery. The liquid-absorbing sheet can absorb and fix the electrolyte and sealing oil. As is shown in FIG. 9, the intermediate cap 35 is provided on the flat part of the top surface thereof with a plurality of small projections 42. The top cap 36 is provided on the back side thereof with pin-like projections 43 for fixing the relation in position between the intermediate cap 35 and the top cap 36. The intermediate cap 35 is provided with holes 44 corresponding to the pin-like projections 43. The liquid-absorbing sheet 46 has through-holes 45 provided to correspond to the small projections 42 and holes 44 and is mounted on the top of the inter-mediate cap 35.

The pin-like projections 43 of the top cap 36 are allowed to pass through the through-holes 45 of the liquid-absorbing sheet 46 and then through the holes 44, thus fixing the top cap 36 on the intermediate cap 35, and bringing the small projections 42 on the front side of the intermediate cap 35 in contact with the ribs 47 on the back side of the top cap 36. This contact is fused with ultrasonic waves. The liquid-absorbing sheet 46 is covered substantially over the entire top surface of the intermediate cap 35, so that the electrolyte leaking out through the safety valve 37 can be absorbed by the sheet. A large amount of the electrolyte leaking out through the safety valve 37 when overcharged can be absorbed by the liquid-absorbing sheet 46 and prevented from leaking out.

What is claimed is:

1. A lead acid battery comprising:
   a battery container comprised of a plurality of cell chambers each containing a cell element, said battery container being provided at one end thereof with a terminal box partitioned by a partition wall from an end one of said cell chambers;
   said terminal box containing a pair of charge and discharge terminals, a thermoswitch and a terminal holder holding said pair of charge and discharge terminals, and a rib monolithically formed together with said partition wall and holding said thermoswitch therein, a surface of said thermoswitch being in contact with said partition wall.

2. The lead acid battery according to claim 1, wherein said rib is in contact with at least one surface of said thermoswitch.

3. The lead acid battery according to claim 1, wherein a heat-insulating air layer is provided between said rib and said terminal holder.

4. The lead acid battery according to claim 1, wherein said terminal holder also functions as a support for fixing a position of said thermoswitch at a given position.

5. A lead acid battery comprising a battery container comprised of a plurality of cell chambers each containing a cell element, said container being provided at one end thereof with a terminal box partitioned by a partition wall from an end one of said cell chambers, said terminal box containing a pair of charge and discharge terminals, a thermal protector and a terminal holder holding said charge and discharge terminals and said thermal protector, wherein said thermal protector is held by said terminal holder to face said partition wall across a space between said thermal protector and said partition wall.

6. A lead acid battery comprising:
   a battery container having a plurality of first partition walls which define a plurality of cell chambers each containing a cell element, said container being provided at one end thereof with a terminal box partitioned by a second partition wall from an end one of said cell chambers;
   a pair of charge and discharge terminals contained in said terminal box;
   a lead wire positioned at tops of said first partition walls and connecting one of said terminals in said terminal box to a terminal of the cell element contained in one of said cell chambers which is most distant from said terminal box; and a cap covering said battery container, said cap being adhered to said battery container by an adhesive placed on one side of said cap, said lead wire being embedded in said adhesive.

7. The lead acid battery according to claim 6, wherein said lead wire is mated and fixed to indents provided on the tops of first partition walls partitioning said battery container in said cell chambers.

8. The lead acid battery according to claim 6, wherein said indent for fixing said lead wire is a notch or slit with a small projection monolithically made together with said first partition wall and slightly projecting at the top of said first partition wall.

9. A sealed lead acid battery comprising:
a battery container comprised of a plurality of cell chambers each containing a cell element;
an intermediate cap for said battery container, said intermediate cap being provided on a top thereof with safety valves facing upwardly;
a top cap covering said intermediate cap and having a back side which faces said intermediate cap; and
a liquid-absorbing sheet positioned between said intermediate cap and said top cap;
said top cap being provided at the back side thereof with a plurality of first projections and first holes and said intermediate cap being provided on said top with a plurality of second holes and second projections at positions corresponding to positions of said first projections and first holes, respectively;
said top cap and said intermediate cap being fixed with the second holes and second projections of said intermediate cap mated and fused to said first projections and first holes, respectively, of said top cap;
said intermediate cap being provided on a flat portion of the top thereof with a plurality of small third projections and said liquid-absorbing sheet being provided with through-holes at positions corresponding to positions of said small third projections, and said small third projections of said intermediate cap being adhered through said through-holes to said back side of said top cap.

10. A sealed lead acid battery comprising:
a battery container comprised of a plurality of cell chambers each containing a cell element; and
a cap for said battery, said cap having a main portion and cylindrical vents formed in said main portion to extend from said main portion in a first direction over each of said cell chambers, said vents being capped with cap-type safety valves, said cap being adhered by an adhesive to said battery container, each of said vents having an inside vent portion extending from said main portion in a second direction opposite to said first direction and surrounded by an annular rib having a height higher than a height of said inside vent portion.

11. The lead acid battery according to claim 1, wherein said rib comprises two L-shaped portions which hold said thermoswitch between said two L-shaped portions.

12. The lead acid battery according to claim 11, wherein said two L-shaped portions define a slit through which a side of said thermoswitch remote from said partition wall is exposed.

13. The lead acid battery according to claim 9, wherein said liquid-absorbing sheet has vent holes formed therein at positions corresponding to positions of said safety valves.

14. The lead acid battery according to claim 10, wherein said first direction is oriented away from said battery container and said second direction is oriented toward said battery container.

15. A lead acid battery comprising: a battery container divided into a plurality of cell chambers and a terminal box for terminals , said battery container comprising a partition wall separating said terminal box from said plurality of cell chambers;
a thermoswitch disposed in said terminal box; and
a rib means, formed monolithically with said partition wall, for holding said thermoswitch against said partition wall.

16. A lead acid battery comprising:
a battery container;
an intermediate cap attached to said battery container;
a top cap attached to said intermediate cap on a side of said intermediate cap remote from said battery container; and
a liquid-absorbing sheet disposed between said intermediate cap and said top cap.

17. The lead acid battery according to claim 9, wherein said small third projections are adhered to said back side of said top cap by fusion with ultrasonic waves.

* * * * *